United States Patent [19]

Klaass et al.

[11] Patent Number: 4,555,187

[45] Date of Patent: Nov. 26, 1985

[54] FOIL BEARING ALIGNMENT

[75] Inventors: Reinhard M. Klaass, Phoenix; Francis J. Suriano, Scottsdale, both of Ariz.

[73] Assignee: The Garrett Corporation, Los Angeles, Calif.

[21] Appl. No.: 619,090

[22] Filed: Jun. 11, 1984

Related U.S. Application Data

[62] Division of Ser. No. 430,429, Sep. 30, 1982, Pat. No. 4,502,795.

[51] Int. Cl.$^4$ ............................................. F16L 32/06
[52] U.S. Cl. ................................................... 384/103
[58] Field of Search ............... 384/103, 104, 105, 106, 384/215, 192, 119, 124

[56] References Cited

U.S. PATENT DOCUMENTS 4,178,046 12/1974 Silver et al. ......................... 384/103
4,274,683 6/1981 Gray et al. ........................... 384/106

Primary Examiner—Stuart S. Levy
Assistant Examiner—David Werner
Attorney, Agent, or Firm—Albert J. Miller

[57] ABSTRACT

A bearing support structure for a journal bearing including a plurality of overlapping compliant foils mounted upon one of a pair relatively rotatable members to form an outwardly diverging surface to support the other of the members. The outwardly diverging surface may be formed by varying thickness shims included along the axial length of the plurality of foils.

7 Claims, 13 Drawing Figures

Fig. 5.
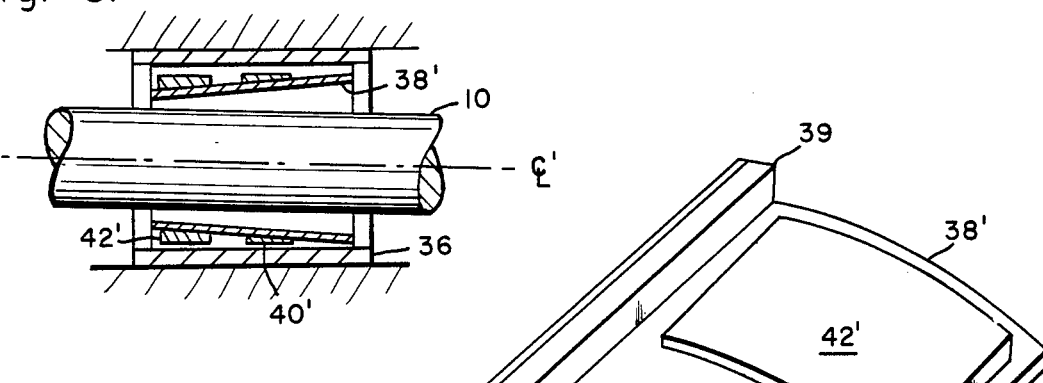
Fig. 6.
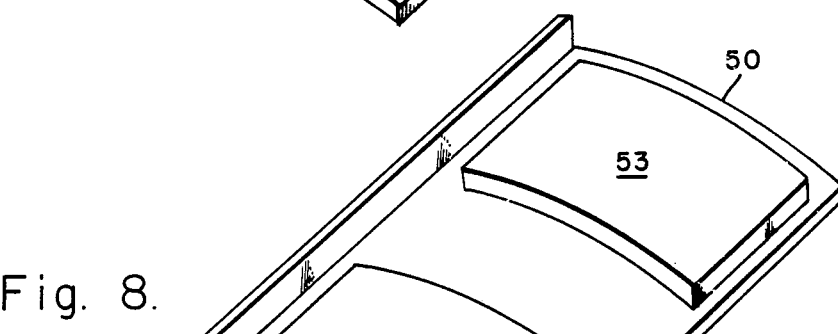
Fig. 8.
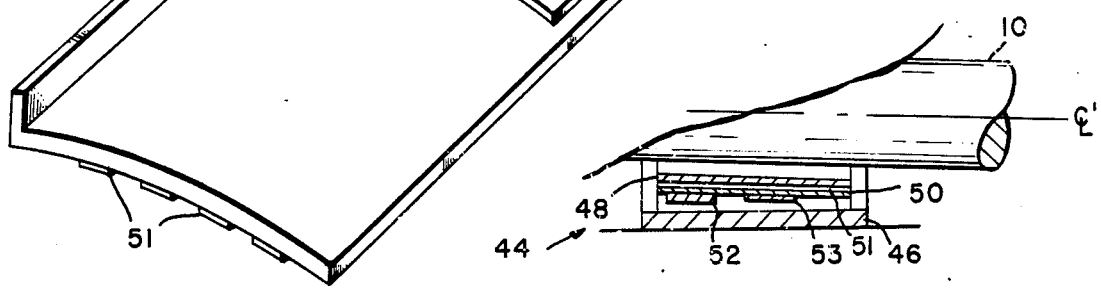
Fig. 7.

Fig. 9.
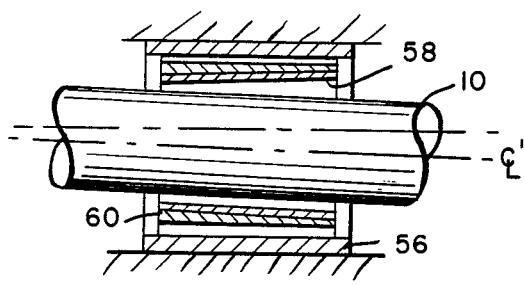
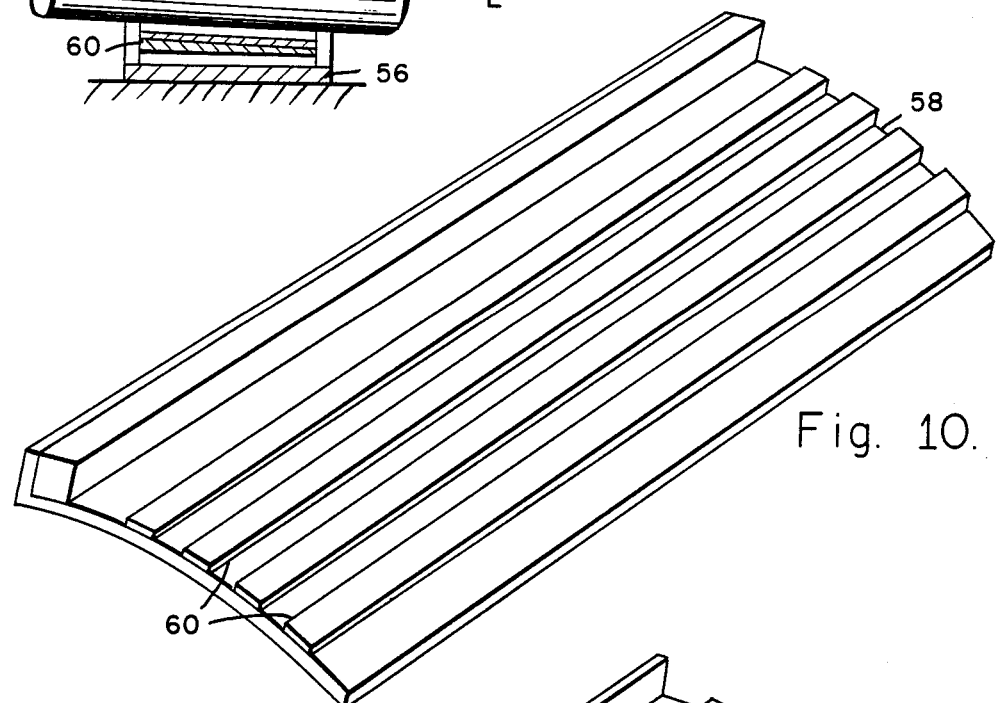
Fig. 10.
Fig. 12.
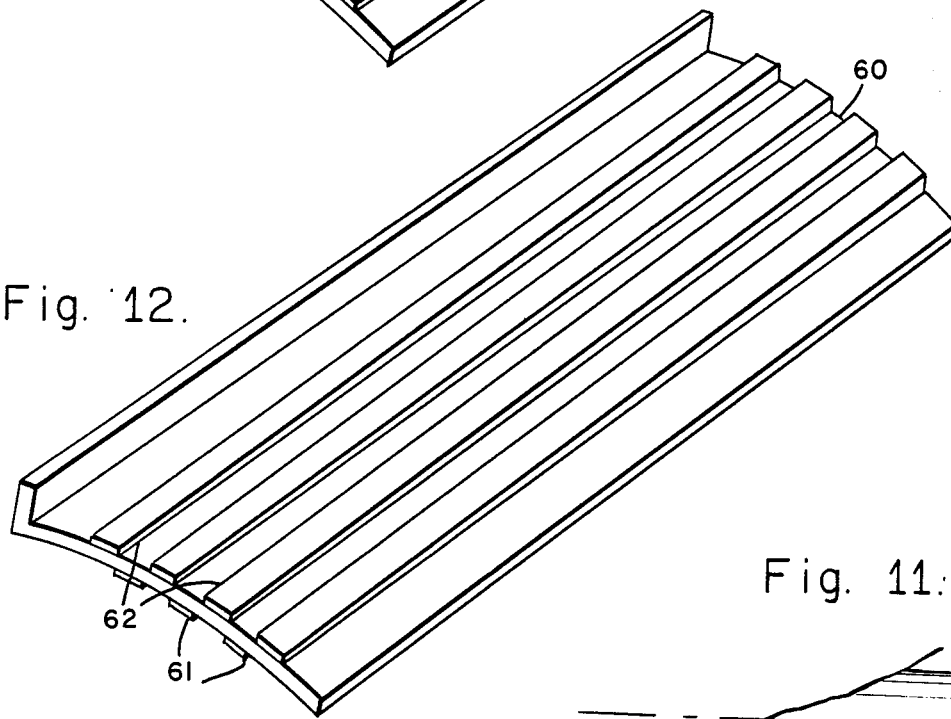
Fig. 11.
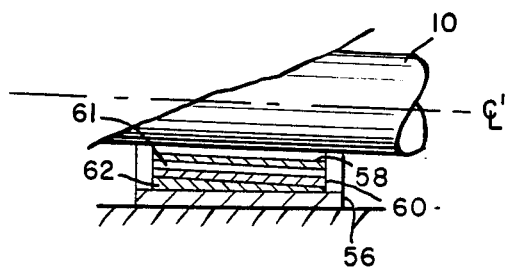

FOIL BEARING ALIGNMENT

The invention herein described was made in the course of or under a contract or subcontract thereunder with the Department of Air Force.

This is a division of application Ser. No. 430,429 filed Sept. 30, 1982, now U.S. Pat. No. 4,502,795.

BACKGROUND OF THE INVENTION

Process fluid or gas bearings are now being utilized in an increasing number of diverse applications. These fluid bearings generally comprise two relatively movable elements with a predetermined spacing therebetween filled with a fluid such as air, which, under dynamic conditions forms a supporting wedge sufficient to prevent contact between the two relatively movable elements.

More recently, improved fluid bearings, particularly gas bearings of the hydrodynamic type, have been developed by providing foils in the space between the relatively movable bearing elements. Such foils, which are generally thin sheets of a compliant material, are deflected by the hydrodynamic film forces between adjacent bearing surfaces and the foils thus enhance the hydrodynamic characteristics of the fluid bearings and also provide improved operation under extreme load conditions when normal bearing failure might otherwise occur. Additionally, these foils provide the added advantage of accommodating eccentricity of the relatively movable elements and further provide a cushioning and dampening effect.

The ready availability of relatively clean process fluid or ambient atmosphere as the bearing fluid makes these hydrodynamic, fluid film lubricated, bearings particularly attractive for high speed rotating machinery. While in many cases the hydrodynamic or self-acting fluid bearings provide sufficient load bearing capacity solely from the pressure generated in the fluid film by the relative motion of the two converging surfaces, it is sometimes necessary to externally pressurize the fluid between the bearing surfaces to increase the load carrying capability. While these externally pressurized or hydrostatic fluid bearings do increase the load carrying capacity, they do introduce the requirement for an external source of clean fluid under pressure.

In order to properly position the compliant foils between the relatively movable bearing elements, a number of mounting means have been devised. The most common practice, as exemplified in U.S. Pat. Nos. 3,366,427, 3,375,046 and 3,615,121, is to attach a rod or bar to one end of the foil which can then be retained in a slot or groove in one of the relatively movable bearing elements. Alternately, as exemplified in U.S. Pat. Nos. 3,382,014 and 3,809,433, a plurality of overlapping foils may be individually mounted on a foil base such as by spot welds. The base would then be frictionally held against one of the relatively movable bearing elements. Individual foils may also be fastened directly to one of the movable bearing elements as illustrated in U.S. Pat. No. 4,262,975. Further, a lip or projection at one end of the foil may be restrained in a slot or groove in one of the relatively movable elements. Examples of this type of mounting can be found in U.S. Pat. Nos. 3,511,544, 3,747,997, 3,809,443 and 3,382,014. Individual foils have also been mounted intermediate the ends thereof as described in U.S. Pat. No. 4,178,046.

In order to establish stability of the foils in most of these mounting means, a substantial pre-load is required on the foil, that is, the individual foils must be loaded against the relatively movable bearing element opposed to the bearing element upon which the foils are mounted. It has been conventional to provide separate stiffener elements or underfoils beneath the foil elements to supply this required pre-load as exemplifed in U.S. Pat. Nos. 3,893,733 and 4,153,315.

Hybrid bearing support structures for rotating elements, that is, a structure combining two or more different types of bearings, have been known. An example is U.S. Pat. No. 3,951,474 which illustrates a fluid film lubricated compliant foil bearing disposed between two relatively rotatable concentric shafts near the midspan thereof with the ends of the two shafts supported, in one embodiment, by rolling contact bearings. Alternately, a hybrid system may comprise a rolling contact bearing and foil bearing supporting opposite ends of a rotating shaft. While the rolling contact bearing has virtually no radial movement allowable, the foil bearing is comparatively soft and allows for measureable radial movement. Thus, there can be some sway misalignment and hence uneven load distribution which can greatly reduce the load carrying capacity and the life of the foil bearing. There are other bearings situations also which can introduce such misalignment or bearing tilt.

SUMMARY OF THE INVENTION

In a bearing misalignment or tilt configuration, such as a hybrid system wherein opposite ends of a rotating shaft are supported by a rolling contact bearing and a foil bearing respectively, means are provided at the foil bearing to correct or minimize such misalignment and thus accommodate any rotor deflection or tilt which would result therefrom. Several embodiments are described to axially redistribute the load within the foil bearing in order to increase its load carrying capacity and extend its operating life.

BRIEF DESCRIPTION OF THE DRAWINGS

FIG. 5 is a sectional view of another alternative embodiment of a foil journal bearing of the present invention;

FIG. 6 is a perspective view of the underside of an individual foil for the foil journal bearing embodiment of FIG. 5;

FIG. 7 is a sectional view of yet another alternate embodiment of a foil journal bearing of the present invention;

FIG. 8 is a perspective view of the underside of an individual foil stiffener for the foil journal bearing embodimentof FIG. 7;

FIG. 9 is a sectional view of still another alternate embodiment of a foil journal bearing of the present invention;

FIG. 10 is a perspective view of the underside of an individual foil for the foil journal bearing embodiment of FIG. 9;

FIG. 11 is a sectional view of still yet another alternate embodiment of a foil journal bearing of the present invention;

FIG. 12 is a perspective view of the underside of an individual foil stiffener for the foil journal bearing embodiment of FIG. 11.

DESCRIPTION OF THE PREFERRED EMBODIMENTS

Figure 1:
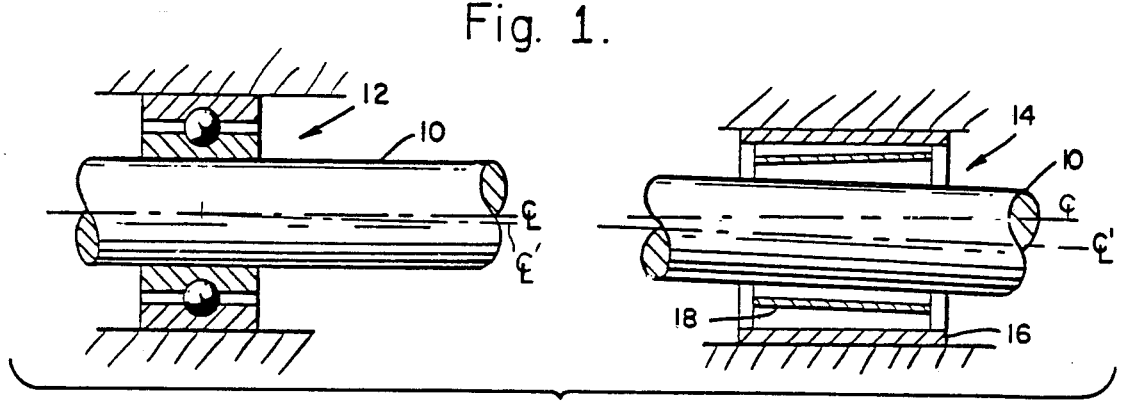
FIG. 1 is a sectional view of a hybrid bearing system including a foil journal having the foil bearing alignment of the present invention.

Referring now to FIG. 1, there is illustrated a hybrid journal bearing in which one end of the shaft 10 is supported by a rolling contact bearing 12 while the other end of the shaft 10 is supported by a foil bearing 14. The foil bearing 14 generally comprises a bushing 16 upon which mounted are a plurality of overlapping compliant foils 18. As is clearly shown, the plurality of individual overlapping foils are outwardly diverging towards the free end of the shaft 10. The centerline designation $\mathcal{C}$ is used to indicate the rotational axis of the shaft 10 as supported by the rolling contact bearing 12 and also the centerline of the outer diameter of foil bearing bushing 16. The centerline designation $\mathcal{C}'$ is used to indicate the axis of the shaft 10 at rest at the foil bearing end thereof. The overlapping compliant foils 18 outwardly diverge at an angle with respect to centerline which is the same as the angle formed between centerlines $\mathcal{C}$ and $\mathcal{C}'$. For purposes of illustration, this misalignment angle, which would generally be on the order of 0.064 degrees, is shown as greatly exaggerated.

Figure 2:
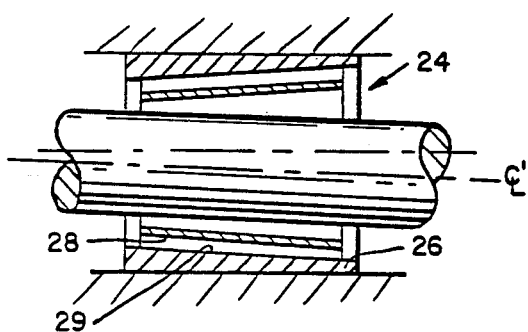
FIG. 2 is a sectional view of one embodiment of a foil journal bearing of the present invention.

As illustrated in FIG. 2, the plurality of overlapping foils 28 can be made outwardly diverging by providing an outwardly diverging conical surface 29 on the inner diameter of the bushing 26. With the outwardly diverging inner diameter 29 of the bushing 26, the foils 28 can be of the conventional type and would follow the contour of the inner diameter 29 of the bushing upon which they are mounted. In this manner the foils would outwardly diverge towards the free end of shaft 10.

While the embodiment of FIG. 2 permits the utilization of conventional foils, it does require forming, such as by machining, of a slightly conical inner surface on the bearing bushing 26. The same effect, that is outwardly diverging foils, can be achieved with a cylindrical inner surface of the bushing as will be described with respect to the remaining figures of this application. A number of alternate embodiments of this type are illustrated in FIGS. 3-13.

Figure 3:
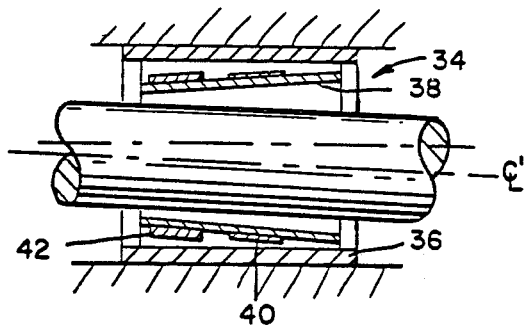
FIG. 3 is a sectional view of an alternative embodiment of a foil journal bearing of the present invention.
Figure 4:
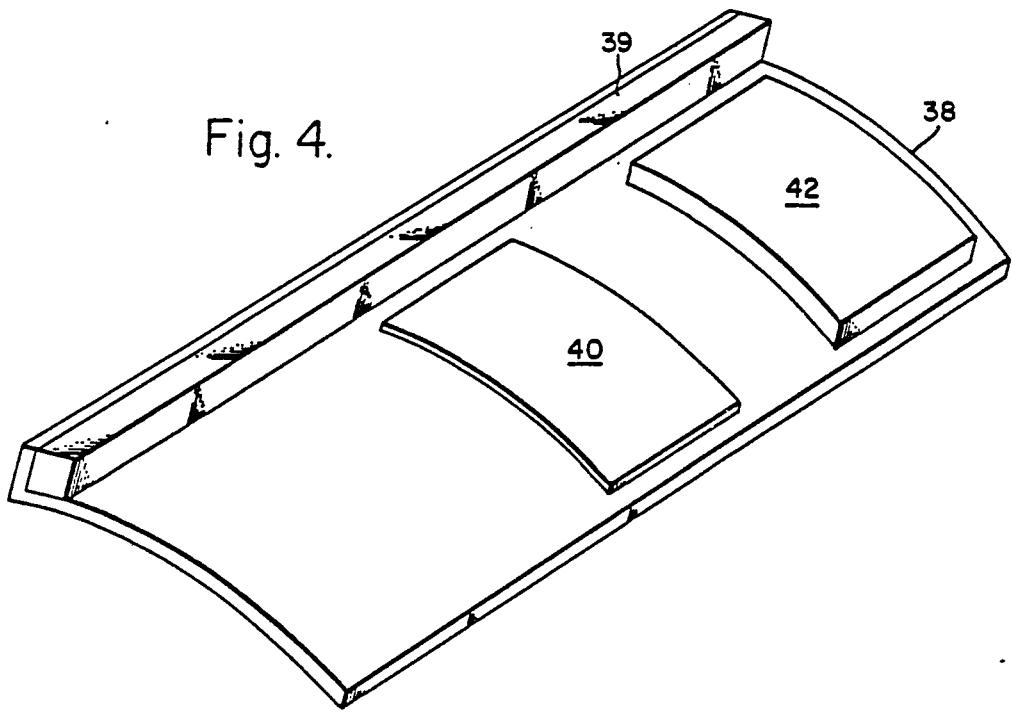
FIG. 4 is a perspective view of the underside of an individual foil for the foil journal bearing embodiment of FIG. 3.

FIGS. 3-6, for example, illustrate achieving the outwardly diverging foil bearing 34 by the use of pads or shims on the underside of the foils. In the embodiment of FIGS. 3 and 4, shims 40 and 42 are affixed to the underside of the foils 38 which are mounted within bushing 36 around shaft 10. The first shim 40, closest to the outer end of the bushing 36 is of a lesser thickness than the outer shim 42. By way of example, shim 40 may have a thickness on the order of 0.001 inches while shim 42 may have a thickness on the order of 0.002 inches. While the foils 38 may be mounted within the bushing 36 by any conventional means, a mounting bar 39 is shown in FIG. 4 for purposes of illustration.

While the shims 40 and 42 illustrated in the embodiment of FIGS. 3 and 4 are of a constant thickness throughout their axial length, a refinement of this embodiment is illustrated in FIGS. 5 and 6. In this embodiment, the shims 40' and 42' increase in thickness along their axial length toward the free end of the shaft 10. Whereas in the FIGS. 3 and 4 embodiment the underside of the shims 40 and 42 are parallel to the underside of the foil 38, the underside of the shims 40' and 42' are parallel to the inner surface of the bushing 36. In both of these embodiments, the foils are mounted in the bushings without the benefit of any underfoil or foil stiffener.

In the embodiment of FIGS. 7 and 8, and also that of FIGS. 11 and 12, the outwardly diverging foil bearing is achieved with the use of underfoils or foil stiffeners. In these embodiments conventional foils can be utilized, and it is the underfoil or foil stiffener which develops the outward divergence of the foils. FIGS. 7 and 8, for example, illustrate a foil journal bearing 44 which provides foils 48 mounted around the shaft 10 within the bushing 46. A plurality of underfoils or stiffeners 50 are also mounted within the bushing 46 underneath the foils 48. A plurality of ribs 51 are formed on the surface of the stiffeners 50 presented to the foils 48 to provide the preload for the foils 48. As most clearly illustrated in FIG. 8, shims 52 and 53 are provided on the underside of the stiffeners 50 to develop the outwardly diverging configuration for the foil bearing 44. The relationship of the thicknesses of the shims 52 and 53 would generally be the same as the relationship of the thicknesses of shim 40 and 42 of the embodiment of FIGS. 3 and 4. It should be recognized that while the shims 52 and 53 are illustrated in FIG. 8 as each being of a constant thickness along their axial length, these shims could each have an increasing thickness along their axial length much the same as the shims 40' and 42' illustrated in FIG. 6 on the underside of foil 38'.

In the embodiment of FIGS. 9 and 10, the underside of foils 58, disposed between shaft 10 and bushing 56, are provided with ribs 60 of increasing thickness along the axial length thereof. Axially increasing thickness ribs 62 can likewise be provided on a stiffener 60 as illustrated in FIGS. 11 and 12. In this case, the stiffener will also have ribs 61 which are disposed within bushing 56 and would be in contact with the foils 58 which actually support the shaft 10.

Figure 13:
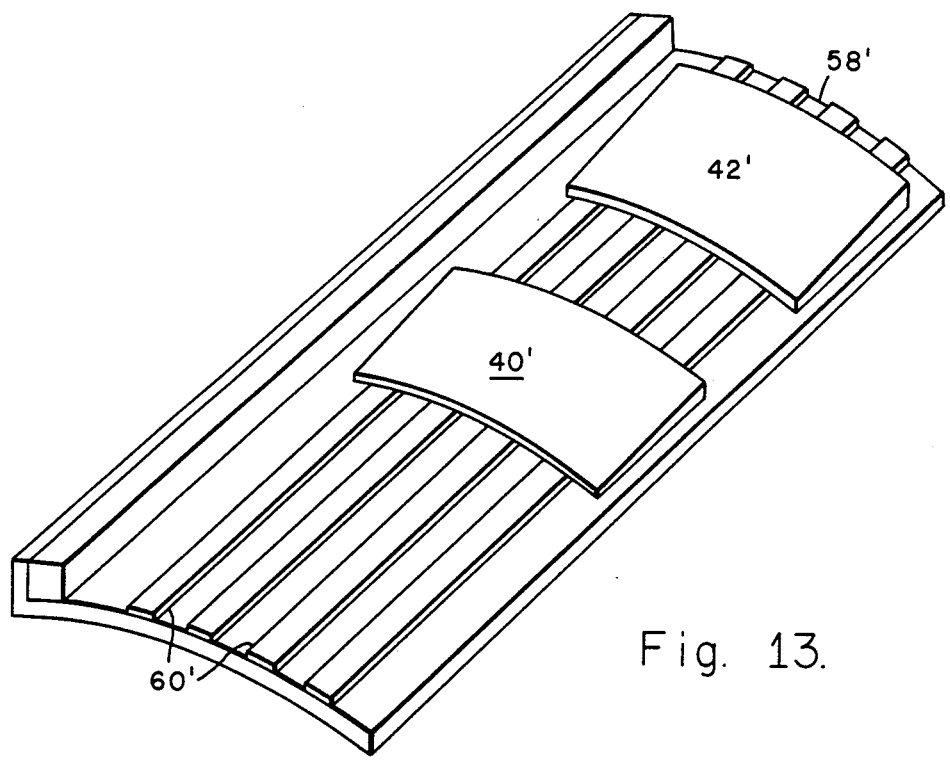
FIG. 13 is a perspective view of the underside of an alternate individual foil for the foil journal bearing of the present invention.

An additional alternative foil configuration is illustrated in FIG. 13. In these embodiments, the foils 58' include ribs 60' on the underside thereof. The ribs 60' are of a uniform thickness along the axial length of the foils 58'. The outwardly divergence is developed by shims 40' and 42' on the underside of the foils placed over the ribs 60'. While the shims 40' and 42' are illustrated in FIG. 13 as having a tapered thickness along their axial length, in many cases it would be equally satisfactory for these shims to be of a constant thickness along their axial length and still provide the outwardly diverging foil bearing surface. Likewise, the ribs 62 on the underside of the stiffener 60 could be made of uniform thickness and shims, of either uniform thickness or varying thickness, placed over such uniform thickness ribs to achieve the same outwardly diverging effect.

While a number of specific embodiments of this invention have been illustrated and described, it is to be understood that these are provided by way of example only and that the invention is not to be construed as being limited thereto but only by the proper scope of the following claims.

We claim:

1. A compliant foil for a diverging fluid bearing, said foil comprising a compliant member having at least two shims disposed along its axial length, each of said shims having a uniform thickness along its axial length with one shim having a greater uniform thickness than the other shim.

2. A compliant foil for a diverging fluid bearing, said foil comprising a compliant member having at least two shims disposed along its axial length, one shim having a thickness of generally 0.001 inches and the other shim having a thickness of generally 0.002 inches.

3. A compliant foil for a diverging fluid bearing, said foil comprising a compliant member having at least two shims disposed along its axial length, each shim having a tapered thickness along its axial length.

4. A compliant foil for a diverging fluid bearing, said foil comprising a compliant member having a plurality of axially extending ribs on one side thereof and at least two shims disposed along the axial length of said ribs, each of said shims having a uniform thickness along its axial length with one shim having a greater uniform thickness than the other shim.

5. A compliant foil for a diverging fluid bearing, said foil comprising a compliant member having a plurality of axially extending ribs on one side thereof and at least two shims disposed along the axial length of said ribs, one shim having a thickness of generally 0.001 inches and the other shim having a thickness of generally 0.002 inches.

6. A compliant foil for a diverging fluid bearing, said foil comprising a compliant member having a plurality of axially extending ribs on one side thereof and at least two shims disposed along the axial length of said ribs, each shim having a tapered thickness along its axial length.

7. The compliant foil of claim 1 or 4 wherein one shim has a thickness generally one-half of the thickness of the other shim.

* * * * *